United States Patent [19]

Hettinger

[11] Patent Number: 5,033,561
[45] Date of Patent: Jul. 23, 1991

[54] DIET CONTROL DEVICE

[76] Inventor: Catherine A. Hettinger, P.O. Box 536564, Orlando, Fla. 32853

[21] Appl. No.: 400,435

[22] Filed: Aug. 30, 1989

[51] Int. Cl.⁵ .................. G01G 19/40; G06F 15/00
[52] U.S. Cl. .................. 177/25.16; 177/25.19; 364/413.29
[58] Field of Search ............. 177/25.16, 25.19; 364/413.29

[56] References Cited

U.S. PATENT DOCUMENTS

| 4,244,020 | 1/1981 | Ratcliff | 177/25.16 X |
| 4,387,777 | 6/1983 | Ash | 177/43 |
| 4,575,804 | 3/1986 | Ratcliff | 177/25.16 X |
| 4,911,256 | 3/1990 | Attikiouzel | 177/25.16 |

FOREIGN PATENT DOCUMENTS 2492976 10/1980 France ..................... 177/25.16

Primary Examiner—George H. Miller, Jr.

[57] ABSTRACT

This invention pertains to a diet control device and more particularly a novel device using a unique method to assess the intake of all nutritive and other substances in a passive, unobstrusive, and utilitarian way. This provides a means for a method of behavioral feedback to assist and provide a means for an individual's weight gain, weight loss, or restriction of certain types of substances. It is also a useful tool for health professionals to assess nutritive intake and to provide a means to assess digestive and various health disorders and also treat these disorders. This is accomplished in the main embodiment with a placemat that records this information and provides a means to use this as a method of weight control.

16 Claims, 2 Drawing Sheets

STEP 1

STEP 2

DIET CONTROL DEVICE

BACKGROUND OF THE INVENTION

1. Field of the Invention

The present invention relates to a diet device and more specifically to a placemat which records all of an individual's intake of substances with information concerning the substances such as calories and a method to control said intake.

2. Prior Art

Many people are presently struggling with various diet restrictions and diet requirements. Intake of foods, drugs, alcohol and the like is very easy to forget about and even if the substance is recalled the amount consumed is unknown. There is also too strong an emphasis on the part of the participant and the diet method on the particular forbidden substance. Writing things down is too prone to cheating. Merely counting by any means leads to cheating in the amounts and most totalyzing means are cumbersome or subject to procrastination. The average American eats out at least three times a week and it can be used as an excuse to get off the diet. When the diet requires an unpleasant-looking cumbersome kitchen device its easy to see why its left at home. Simple kitchen scales are therefore not used commonly for this. Besides the above disadvantages there has been no easy-to-use way to passively record intake of food and the like. Instead of requiring any special behavior its useful to have a method which uses our present behavior—i.e. eating from plates, bowls etc, which are on a surface. A placemat which is portable is an ideal way to influence a control method on our eating, drinking etc. behavior. Special behavioral techniques using positive reenforcement for the increase in allowable food can be applied appropriately when a truly complete measurement method is being employed. Disorders such as Anorexia Nervosa may well respond better to methods of mere recording for the user without the problem of overemphasis any written account has.

People under nursing care often do not eat properly and a more automated method may better influence better eating for patients. There is no prior art found which passively records and/or controls intake of food and other substances.

SUMMARY OF THE INVENTION

The principal object of the present invention is to provide a novel device using a unique method to assess the intake of all nutritive substances in an unobtrusive, utilitarian and easy-to-use way.

Another object is to utilize this method incorporating this device to provide a means for a method of behavioral feedback using various chosen factors to assist and provide a means for an individual's weight loss, weight gain, or fulfillment of special diet restrictions.

A further object of the present invention is to serve as a useful tool for health professionals to assess nutritive intake and to provide a means to diagnose and treat various health disorders.

The foregoing objects and others that are apparent are achieved through the use of a weight control placemat. The user of this method of control decides that everything which is consumed must be placed on the placemat. Once this decision is made it can then passively record all intake. It is a well known theory that control can better be attained when good measurement is being made. Feedback is also important and with this method the desired factors such as but not limited to amounts of food groups, calories, time, behavioral information, emotional well-being, health information and the like conducive to control can be chosen as feedback information to the individual or supressed and instead only used to inform a health professional.

The preferred embodiment has a surface divided into food groups. Each food is placed on the placemat in sequence and zeroed between dishes. The amount of each food group is then stored in each register. Additional information regarding the food such as calories per gram can be recorded as total amounts in a register. Leftovers are subtracted from these totals providing a sound measurement. Printing means are optional to provide a written record. Otherwise selected totals are read periodically (i.e. daily) and noted.

The features and advantages of the present invention will become apparent from the following detailed description of the invention when read with the accompanying drawings.

DETAILED DESCRIPTION OF PREFERRED EMBODIMENT

Figure 1:
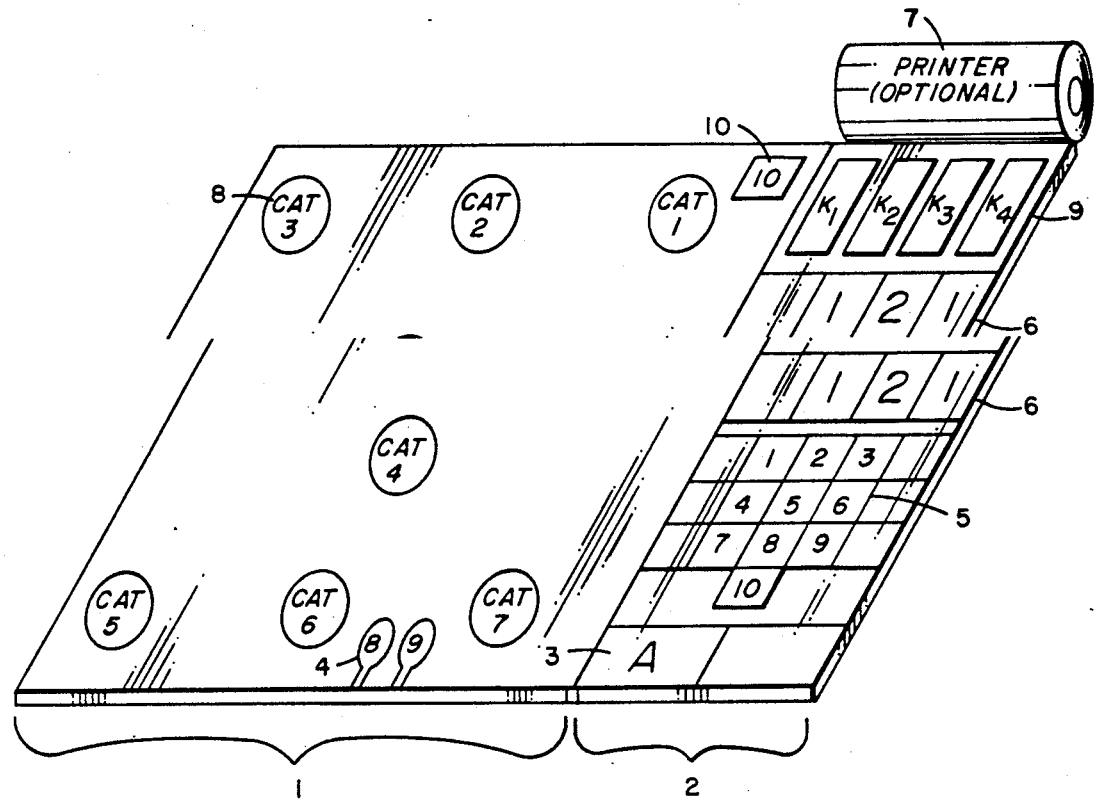
FIG. 1 is the most preferred embodiment of the weight control placemat of the present invention.

Referring specifically to FIG. 1, there is illustrated the most preferred embodiment of the weight control placemat. This invention includes a placemat 1 of sufficient size to hold all contents of a meal. It is device composed of a measuring method using an electronic, strain gauge scale which transmits an electronic signal. This is then recorded in unit 2 an electronic device along with any other factors. The unit is turned on and zeroed through 3 and category 8 is entered using the keys 5. The keys 9 allow entering of the weight data along with optional information which may include but not limited to calories, fat, salt, cholesteral and the like. Information counting number of glasses of water, beverage, or drug as in 10 is also entered. Condiments, 4, are entered also. Additional information such as but not limited to time, exercise information, emotional well-being and the like can also be entered through 5 and keys 9. A display 6 and an optional printer 7 are available for reading or recording.

Figure 2:
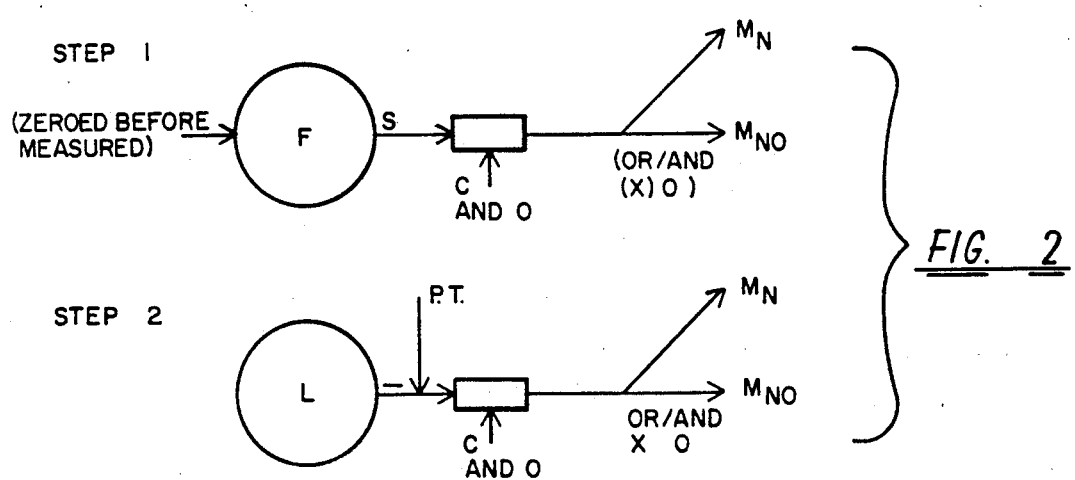
FIG. 2 is a flowchart of the use of this embodiment.

Referring now to FIG. 2 we can see the flow of information and operation of this invention. Food F is placed on the placemat. Signal S is transmitted and additional factors C (Calories per gram) and O (Optional factors such as fats, cholesterol, salt, sugar and the like) are sent to register Mn (totalyzing amount) and Mno (amount multiplied by O optional factors). In Step 2 of FIG. 2 the leftovers including plates, utensils etc. L are measured and subtracted from the previous total P.T. each time a dish is removed. It is then entered in the appropriate register including or not including the optional information Mno or Mn.

Figure 3:
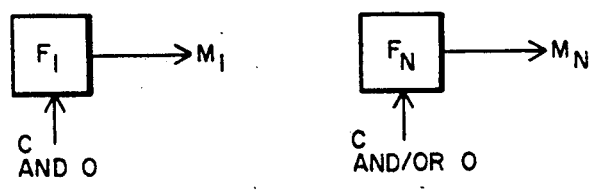
FIG. 3 is an illustration of the use of a second embodiment which appears identical to FIG. 1 but the category areas are each weighed seperately using individual scales.
Figure 3:
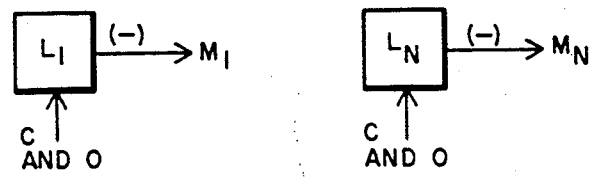
Figure 3:
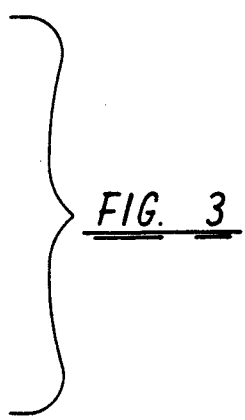

An alternate embodiment of this design is FIG. 3. Its appearance is the same as FIG. 1 but the categories operate seperately. Instead of one weighing mechanism individual mechanisms which are electronic scales, are used for each category. In Step 1 the first item F1 is measured along with any factors C and O and placed in register M1. This can be done by entering or automatically. Additional items are measured individually Fn and the amounts placed in registers Mn. In Step 2 the leftovers for L1 and Ln are subtracted from the amounts in memory M1 and Mn.

Figure 4:
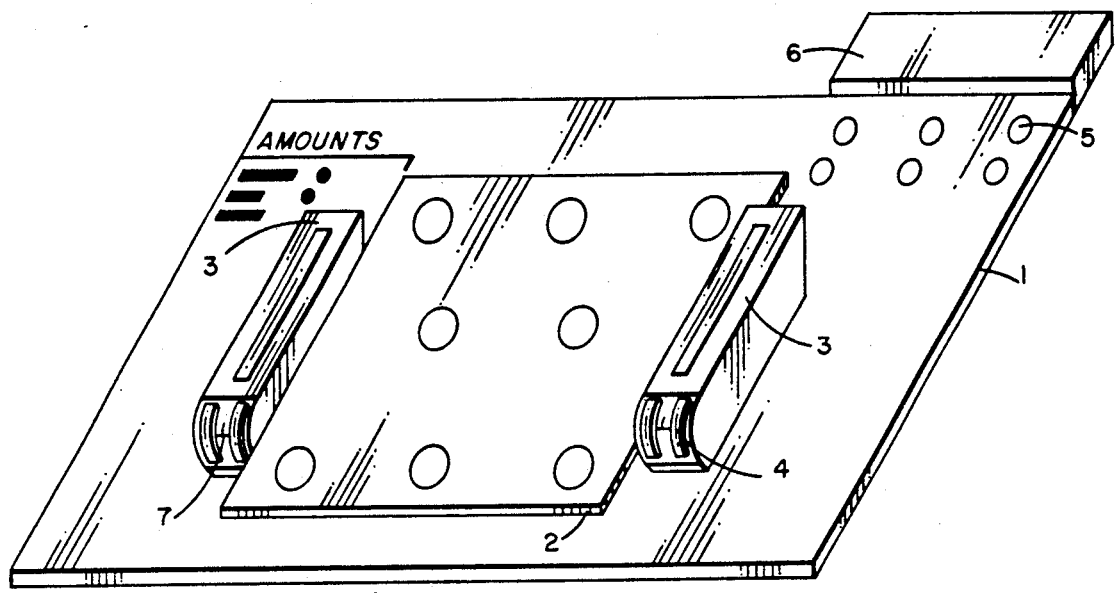
FIG. 4 is an alternate embodiment showing a mechanical way to design the weight control placemat of the present invention.

Referring to FIG. 4 there is another preferred embodiment which uses an alternate method of recording and control. It also is a weight control placemat comprising two panels 1 and 2 and opposite weighing mechanisms 3 supporting Panel 2. Lengths of paper 4 placed on 3 are marked off using a pen or maker or cut using a stylus or scissors or torn with the fingers according to the travel of the pointer 7 on 3. This travel represents the addition of each dish of food. Upon completion of the meal the paper can be decreased in size by making, cutting, or tearing according to the amount of leftovers and the weight of containers. Disks 5 are used to measure the amount of condiments, beverages if desired, pills etc. A record for each meal is easily placed in food diary 6 using the cut, torn, or marked tapes 4 and disks 5. The panel 1 can also be used as a visual method which graphically shows the length of tape corresponding to the amount of each food or food group to continually assess the amount of consumption of food and the like. Additional information such as time of day, emotional well being and health factors can either be written or coded as a sticker and placed on a placemat and/or kept in the diary to be used for the use of the user or healthcare professional to assess eating habits.

While preferred embodiments of the present invention have been shown and described herein, it will be obvious that such embodiments are provided by way of example only. Numerous variations, changes and substitutions will occur to those skilled in the art without departing from the invention herein. Accordingly, it is intended that the invention be limited only by the spirit and scope of the appended claims.

I claim:

1. A diet apparatus comprising:
   weighing means for producing a readout responsive to a mass being placed thereon, said weighing means having at least one scale;
   a placemat shaped to fit on said weighing means so that food items can be placed thereon, said placemat being removably detachable from said weighing means;
   a readout means for showing amounts which is a pointer for said scale which shows the amount of food and containers placed on the placemat;
   a consumed food amount storage means for recording the amount of food which is paper which is cut off according to the travel of said pointer;
   a container measuring means for initializing which zeros the initial weight of containers by starting the paper after the container has been added;
   a category type memory means for noting the food group in the category appropriate to the range of calories per unit weight, whereby dieting information is readily available for the purpose of providing behavioral feedback to provide a means to control diet.

2. A diet apparatus in accordance with claim 1 wherein additional information including but not limited to glasses of fluid and tablespoons of condiment are stored by using coding means for noting the information by using stickers and disks.

3. A diet apparatus in accordance with claim 2 in which said category type memory means includes the categories of salt and cholesterol of selected foods.

4. A diet apparatus in accordance with claim 2 having a placemat which is permanently attached to said weighing means.

5. A diet apparatus in accordance with claim 2 in which said category type memory means includes the categories of the food according to the categories of fat per unit weight.

6. A diet apparatus in accordance with claim 2 wherein the category type memory means for noting the kind of food is accomplished by written or coded stickers according to the food category.

7. A diet apparatus in accordance with claim 2 in which said category type memory means includes the categories of protein and carbohydrates.

8. A diet apparatus in accordance with claim 2 in which said category type memory means includes the categories of the food which is based on nutritive food groups.

9. A diet apparatus comprising:
   a weighing means for producing a readout responsive to a mass being placed thereon, said weighing means having at least one scale;
   a placemat shaped to fit on said weighing means so that food items can be placed thereon, said placemats being removably detachable from said weighting means;
   a readout means for showing amounts from said scale which shows the amount of food and containers placed on said placemat;
   a container measuring means for initializing which zeros the initial weight of containers, if desired;
   a consumed food amount storage means for recording the amount of consumed food by measuring the difference between the initial said readout and a final said readout of the leftover food and the container;
   a category type memory means for noting the kind of food by recording the category of the range of calories per unit of weight which is recorded and stored along with said amount of consumed food, whereby dieting information is readily available for the purpose of providing behavioral feedback to provide a means to control diet.

10. A diet apparatus in accordance with claim 9 wherein the readout means for showing amounts from the scale is an electronic signal which is coupled with a consumed food amount storage means which is an electronic means coupled to said weighing means to accept a signal from one said weighing means scale to record and store information from said scale signal and the category type memory means is a process to store information to indicate calories and fat, whereby dieting information is readily available on food products placed on said diet apparatus.

11. A diet apparatus in accordance with claim 10 having an input means coupled to said electronic means and having a keyboard input means coupled to said electronic means whereby scale information can be keyed into said electronic means.

12. A diet apparatus in accordance with claim 10 in which said means to process said stored information from said weighing means scale includes means to process and indicate salt and cholesterol of selected foods.

13. A diet apparatus in accordance with claim 10 in which said means to process said stored information from said weighing means scale includes means to process and indicate protein and carbohydrates.

14. A diet apparatus in accordance with claim 10 in which said means to process said stored information from said weighing means scale includes means to process and indicate the food category appropriate for the food group.

15. A diet apparatus in accordance with claim 10 having a printing means coupled to said electronic means.

16. A diet apparatus in accordance with claim 10 having a placemat which is permanently attached to said weighing means.

* * * * *